United States Patent [19]

Nair et al.

[11] Patent Number: 5,457,012
[45] Date of Patent: Oct. 10, 1995

[54] TRANSPARENT FILM-FORMING AQUEOUS COMPOSITIONS FOR MAGNETIC RECORDING

[75] Inventors: Mridula Nair, Penfield; George L. Oltean, Rochester, both of N.Y.

[73] Assignee: Eastman Kodak Company, Rochester, N.Y.

[21] Appl. No.: 229,267

[22] Filed: Apr. 18, 1994

[51] Int. Cl.⁶ .................................................. G03C 1/76
[52] U.S. Cl. .................... 430/495; 430/496; 430/501; 430/523; 430/140; 428/694 B; 428/694 BN; 428/694 BA; 252/62.51; 252/363.5
[58] Field of Search ........................ 430/495, 496, 430/501, 523, 140; 428/694 B, 694 BN, 694 BA; 252/62.51, 363.5

[56] References Cited

U.S. PATENT DOCUMENTS

| | | | |
|---|---|---|---|
| 3,782,947 | 1/1974 | Krall . | |
| 3,967,045 | 6/1976 | Kurobe et al. | 428/463 |
| 4,026,713 | 5/1977 | Sambucetti et al. | 430/114 |
| 4,068,040 | 1/1978 | Yamada et al. | 428/425 |
| 4,279,945 | 7/1981 | Audran et al. | 427/130 |
| 4,302,523 | 11/1981 | Audran et al. | 430/140 |
| 4,368,237 | 1/1983 | Yamada et al. | 428/413 |
| 4,454,282 | 6/1984 | Bradshaw et al. | 106/20 |
| 4,581,246 | 4/1986 | Melzer et al. | 427/48 |
| 4,612,138 | 9/1986 | Keiser | 252/62.59 |
| 4,758,275 | 7/1988 | Yubakami et al. | 106/20 |
| 4,990,276 | 2/1991 | Bishop et al. | 252/62.54 |
| 5,009,925 | 4/1991 | Grigat et al. | 427/48 |
| 5,102,732 | 4/1992 | Goto et al. | 428/329 |
| 5,147,768 | 9/1992 | Sakakibara | 430/501 |
| 5,217,804 | 6/1993 | James et al. | 428/329 |
| 5,240,626 | 8/1993 | Thakur et al. | 252/62.54 |
| 5,252,441 | 10/1993 | James et al. | 430/496 |
| 5,254,449 | 10/1993 | James et al. | 430/533 |
| 5,284,512 | 2/1994 | Koskan et al. | 106/416 |

FOREIGN PATENT DOCUMENTS

| | | | |
|---|---|---|---|
| 686172 | 5/1964 | Canada | 352/33 |
| 0467300 | 1/1992 | European Pat. Off. | 430/379 |
| 62/054146 | 11/1987 | Japan . | |
| 01/180231 | 7/1989 | Japan . | |
| 04/125636 | 4/1992 | Japan | 430/502 |
| 04/124626 | 4/1992 | Japan | 430/524 |
| 86/04719 | 8/1986 | WIPO . | |

*Primary Examiner*—Charles L. Bowers, Jr.
*Assistant Examiner*—Mark F. Huff
*Attorney, Agent, or Firm*—Andrew J. Anderson

[57] ABSTRACT

A stable aqueous dispersion of magnetic particles contains a dispersant having an HLB number of at least 8. The dispersion is prepared by milling an aqueous slurry of magnetic particles until there are substantially no agglomerates of magnetic particles present. The dispersion can be used to prepare magnetic recording elements and, in particular, photographic elements having a transparent magnetic recording layer.

22 Claims, 3 Drawing Sheets

Another aspect of this invention comprises a process for the preparation of a fine solid particle aqueous dispersion of magnetic particles which comprises the steps of:

(a) forming an aqueous slurry of solid magnetic particles and a dispersant having an HLB number of at least 8; and (b) milling said slurry for a period of time sufficient ensure that substantially no agglomerates of the magnetic particles are present.

A further aspect of this invention comprises a magnetic recording element comprising a support having a magnetic recording layer prepared by adding a film-forming binder to a dispersion of magnetic particles in an aqueous medium containing a dispersant having an HLB number of at least 8 to form a coating composition and applying said coating onto the support.

Yet another aspect of this invention comprises a process for preparing a magnetic recording element which comprises the steps of adding a film-forming binder to a dispersion of magnetic particles in an aqueous medium containing a dispersant having an HLB number of at least 8 to form a coating composition and applying said coating the resulting composition onto a support.

A still further aspect of this invention comprises a photographic element comprising a light sensitive layer and a transparent magnetic recording layer prepared by adding a film-forming binder to a dispersion of magnetic particles in an aqueous medium containing a dispersant having an HLB number of at least 8 to form a coating composition and applying said coating the resulting composition onto a photographic support.

Another aspect of this invention comprises a process for preparing a photographic element having a transparent magnetic recording layer which comprises adding a film-forming binder to a dispersion of magnetic particles in an aqueous medium containing a dispersant having an HLB number of at least 8 to form a coating composition and applying said composition onto a photographic support.

ADVANTAGEOUS EFFECT OF THE INVENTION

This invention provides a stable aqueous dispersion of magnetic particles that when combined with a film-forming binder, such as gelatin in water, can be coated onto a support to provide a transparent magnetic recording element whose optical quality matches that of a similar layer coated from an organic solvent. The aqueous system is environmentally more sound compared to equivalent organic solvent dispersions. Coatings made from water are in general cheaper than those produced from organic solvents.

Further, the dispersion in gelatin can be hardened to control swell without compromising the optical quality of the coating.

DETAILED DESCRIPTION OF THE INVENTION

This invention relates to transparent layers containing magnetic particles, the layers being capable of having coded information written and read therefrom. The transparent layers containing magnetic particles in accordance with this invention are particularly applicable for use in combination with photographic elements wherein information can be written into the magnetic layer without affecting the quality and performance of the light-sensitive photographic elements.

It is a feature of this invention that the transparent magnetic layers are prepared from a stable aqueous dispersion of magnetic particles. The aqueous dispersion contains substantially no organic solvent.

The magnetic layer may comprise, for example, fine ferromagnetic powders such as ferromagnetic gamma-iron oxides, cobalt surface-treated ferromagnetic iron oxides, cobalt-doped ferromagnetic iron oxides, cobalt containing $Fe_2O_3$, ferromagnetic magnetites, cobalt-containing ferromagnetic magnetites, ferromagnetic chromium dioxides, ferromagnetic metal powders, ferromagnetic iron powders, ferromagnetic alloy powders and the class of ferromagnetic ferrite powders including barium ferrites. Additionally, the above mentioned powder particles may be modified to provide lower light extinction and scattering coefficients by providing them with a shell, of at least the same volume as the magnetic core, of a low refractive index material that has its refractive index lower than the transparent polymeric material used to form the magnetizable layer. Typical shell materials may include amorphous silica, vitreous silica, glass, calcium fluoride, magnesium fluoride, lithium fluoride, polytetrafloroethylene and fluorinated resins. Examples of the ferromagnetic alloy powders include those comprising at least 75% by weight of metals which comprise at least 80% by weight of at least one ferromagnetic metal alloy (such as Fe, Co, Ni, Fe—Co, Fe-Ni, Co-Ni, Co-Ni-Fe) and 20% or less of other components (such as Al, Si, S, Sc, Ti, V, Cr, Mn, Cu, Zn, Y, Mo, Rh, Re, Pd, Ag, Sn, B, Ba, Ta, W, Au, Hg, Pb, La, Ce, Pr, Nd, Te, and Bi). The ferromagnetic metals may contain a small amount of water, a hydroxide or an oxide. In addition, magnetic oxides with a thicker layer of lower refractive index oxide. or other material having a lower optical scattering cross section as taught in U.S. Pat. 5,252,444 may also be used.

The dispersion in accordance with this invention contains magnetic particles which preferably are acicular or needle like magnetic particles. The average length of these particles along the major axis preferably is less than about 0.3, more preferably, less than about 0.2 micron. The particles preferably exhibit an axial ratio, that is, a length to diameter thickness ratio of up to about 5 or 6 to 1. Preferred particles have a specific surface area of at least $30m^2/g$, more preferably of at least $40m^2/g$. Typical acicular particles of this type include for example, particles of ferro and ferro iron oxides such as gamma-ferric oxide, complex oxides of iron and cobalt, various ferrites and metallic iron pigments. Alternatively, small tabular particles such as barium ferrites and the like can be employed. The particles can be doped with one or more ions of a polyvalent metal such as titanium, tin, cobalt, nickel, zinc, maganese, chromium, or the like as is known in the art.

A preferred particle consists of Co surface treated $\gamma$-$Fe_2O_3$ having a specific surface area of greater than $40m^2/g$. Particles of this type are commercially available and can be obtained from Toda Kogyo Corporation under the trade names CSF 4085V2, CSF 4565V, CSF 4585V and CND 865V and are available on a production scale from Pfizer Pigments Inc. under the trade designations RPX-4392, RPX-5003, RPX-5026 and RPX-5012. For good magnetic recording, the magnetic particles preferably exhibit coercive force above about 500 Oe and saturation magnetization above 70 emu/g.

TRANSPARENT FILM-FORMING AQUEOUS COMPOSITIONS FOR MAGNETIC RECORDING

FIELD OF THE INVENTION

This invention relates to a stable aqueous dispersion of magnetic particles and to a process for the preparation thereof. The invention also relates to a process for applying a magnetic layer to a support and to the resulting magnetic recording element. The invention further relates to a photographic element having a transparent magnetic layer and to a method of making said photographic element.

BACKGROUND

Conventional magnetic recording elements that are used for recording sounds or images are generally opaque to visible light regardless of the nature of the magnetic particles used in such elements. For example, motion picture films often are provided with a magnetic sound track which generally is opaque and does not cover that portion of the film used in the projection of images.

Canadian Patent 686,172 shows that a magnetic recording layer may be transparent to visible light when it contains low concentrations of magnetizable particles. According to this patent, such a layer is coated over a layer containing descriptive material which allows a user to simultaneously hear and see certain subject matter. However, this patent points out that the electromagnetic characteristics, i.e., the magnetic recording and reproducing characteristics, of such a layer are inferior to those of conventional magnetic layers as a result of the very low concentration of magnetizable particles.

U.S. Pat. No. 3,782,947 discloses a photographic product which carries magnetic particles distributed across the image area of the product. The particle distribution and sizes are so designed that the composite granularities of the photographic and magnetic recording media are such that the magnetic distribution is essentially transparent in a photographic sense. According to this patent, the photographic image can be viewed via the magnetic distribution and the magnetic distribution can be employed for recording and playing back information.

U.S. Pat. No. 4,279,945 discloses a process of preparing magnetic recording elements containing a transparent recording layer. According to this patent, the magnetic recording and reproducing characteristics obtained are comparable to conventional opaque magnetic layers without the need for matching the granularity of a magnetic medium to that of photographic medium. However, the process requires that the layer containing magnetic particles be treated using one or both of the following process steps, (1) compacting the layer while it is in a malleable state to reduce its thickness (e.g., calendaring), or (2) imbibing into the layer a substantially transparent liquid having a refractive index that is substantially the same as that of the binder.

Elements of the type described in the above-cited patent have not achieved widespread commercial success for various reasons. For example, the elements described in U.S. Pat. No. 4,279,945, as indicated by the Figure therein, are substantially opaque at wavelengths less than about 500 nm and thus are not useful in color films. Further, the disclosed process requires that the magnetic recording layer be calendared while it is in a malleable state and/or that a transparent liquid be imbibed into the magnetic recording layer. On the other hand, U.S. Pat. No. 3,782,947 contemplates coating a dispersion containing magnetic particles onto a film base. However, the quantity of solvent required in such a process is unattractive from both an economic and environmental standpoint. Additionally, in continuous wide web coating techniques adapted for commercial manufacturing operations, solvent attack on the film base and can render the element unusable, resulting in unacceptable manufacturing inefficiencies and excessive costs. Moreover, it is difficult to prepare magnetic recording layers in such a coating process having a thickness of less than about 5 microns.

U.S. Pat. No. 4,990,276 discloses a dispersion of magnetic particles, a dialkylester of phthalic acid and a dispersing agent. U.S. Pat. No. 5,254,449 discloses the use of such a dispersion to provide a substantially transparent magnetic recording layer in the preparation of a novel photographic element. The process described in this patent calls for dilution of the dispersion with a binder in an organic solvent such as a mixture of methylene chloride and methanol, to form a casting composition. The casting composition is then extruded under pressure onto a photographic support.

It is evident that it would be desirable to provide a photographic element with a magnetic layer of the desired transparency without the use of an organic solvent. Further, it is evident that it would be desirable to provide a stable aqueous dispersion of magnetic particles from which to prepare such an element.

PROBLEM TO BE SOLVED BY THE INVENTION

It is desirable to eliminate the use of organic solvents in making a magnetic recording element, in particular a photographic element, such as a film, having a photographically transparent magnetic layer while still maintaining the optical quality of the photographic element. The use of organic solvents is unattractive for safety and environmental reasons. Coatings of aqueous magnetic dispersions on the other hand tend to exhibit poor quality and result in high optical density and granularity.

SUMMARY OF THE INVENTION

This invention provides a stable aqueous dispersion of magnetic particles. A film-forming binder can be added to the dispersion which then can be applied to a support to form a transparent magnetic layer.

This invention also provides a novel photographic element which contains a magnetic recording layer which has excellent magnetic characteristics and which is photographically transparent by virtue of its low granularity and optical density.

The stable aqueous dispersion of this invention comprises a dispersion of magnetic particles in an aqueous medium which contains an anionic dispersant having an HLB (hydrophilic/lipophilic balance) number of at least 8. The dispersant preferably is an amphipathic water-soluble or water-dispersible organic compound. A film-forming a binder such as gelatin, or other hydrophilic colloid, in an aqueous medium can be added to the dispersion and the resulting coating composition coated on a support to yield a transparent magnetic layer.

Accordingly, one aspect of this invention comprises a fine solid particle aqueous dispersion which comprises an aqueous medium containing dispersed magnetic particles and a dispersant having an HLB number of at least 8.

In accordance with this invention, the transparent magnetic layer is prepared by initially forming a concentrated dispersion of the magnetic particles in water together with a dispersant having an HLB number of at least 8, preferably an amphipathic water-dispersible or soluble polymeric dispersant, and milling the resulting mixture in a device such as a ball mill, a roll mill, a high speed impeller mill, media mill, an attritor, a sand mill or the like. Milling is continued for a sufficient time to ensure that substantially no agglomerates of the magnetic particles remain.

The concentration of the magnetic particles in the dispersion is preferably about 5 to about 75%, more preferably about 10 to about 50% and most preferably about 15 to about 35%, the percentages being by weight based on the weight of the dispersion.

The length of time required depends on the particular milling device used. In general, milling should be continued from about 0.5 to about 8 hours, preferably from about 1 to about 4 hours.

As mentioned above, the magnetic particles are milled in an aqueous slurry containing a dispersant having an HLB number of at least 8. The HLB number of a dispersant is a measure of the hydrophilic/lipophilic balance of the dispersant and can be determined as described in "Polymeric Surfactants," Surfactant Science Series, volume 42, page 221, by I. Piirma. Preferably the dispersant is polymeric.

The general class of preferred dispersants are water-soluble or water-dispersible polymers represented by one of the following structures.

$$A-B \qquad \text{I}$$

$$A-B-A \qquad \text{II}$$

$$\begin{array}{c} -[B]_m-[C]_n- \\ | \\ A \end{array} \qquad \text{III}$$

and $$(AB)_x Q (BA)_z \qquad \text{IV}$$

wherein each A independently represents 1 to about 150 repeat units of a water-soluble component, B and C each represent a linear or branched alkyl, aryl alkaryl or cyclic alkyl radical containing at least 7 carbon atoms, or 3 to about 100 repeat units of a propylene oxide or higher alkylene oxide or combinations thereof, Q represents a multivalent linking group, m=50–100 mole %, n=1–50 mole %, with the proviso that m+n=100 mole %, x=1 or 2 and z=1 or 2.

A is preferably a poly(ethylene oxide) unit, but can be any other water-soluble unit, such as polyethyloxazoline, poly(vinyl alcohol), poly(vinyl pyrrolidone) or the like. B and C are radicals containing at least 7 carbon atoms, preferably 7 to 500 carbon atoms and more preferably, 15 to 300 carbon atoms. Illustrative radicals include, for example, C20-C50 alkyl, copolymer of maleic anhydride and an alkene, arylphenoxy, alkylphenoxy, poly(propylene oxide), poly(butylene oxide),or the like. Q is a multivalent linking group having the valence of X+Z. Preferably Q is a polyamine such as ethylene diamine, tetramethylene diamine, etc., a polyhydroxy compound, such as pentaerythritol, or the like.

Generally, dispersants useful in the present invention are well known in the art and some of them are commercially available. Typically the dispersant comprises water-soluble or dispersible block copolymers either linear or branched.

Preferred dispersants comprise various poly(ethylene oxide) containing block copolymers. Examples of preferred dispersants are illustrated for example by the ethoxylated compounds as listed below.

| Trade Name | Manufacturer | Chemical Identification | HLB |
|---|---|---|---|
| Unithox ethoxylates | Petrolite | ethoxylated C24-50 n-alkane alcohols | 10–16 |
| Dapral GE202 | Akzo | partial ester of a branched carboxylic acid copolymer | >10 |
| Tetronic 908 | BASF Corporation | block copolymer of poly (ethylene oxide) and poly (propylene oxide) | >24 |
| Syn Fac 334 | Milliken Chemical | Arylphenol ethoxylate | 11 |
| Syn Fac 8216 | Milliken Chemical | Arylphenol ethoxylate | 15 |
| Syn Fac 8210 | Milliken Chemical | Polyalkoxylated aryl-phenol | 11 |
| Syn Fac 8337 | Milliken Chemical | Potassium salt of a phosphated alkoxylated aryl-phenol | 20 |

More specifically, illustrative preferred dispersants have the following structures:

$$CH_3(CH_2)_x(OCH_2CH_2)_zOM$$

x = 24–50
z = 8–20

$M = H, SO_3^-X^+, \text{ or } PO_3^{2-}2X^+$
where X is cation such as
$Na^+, K^+, NH_4^+$, etc.

n = 10–25

R = aryl, alkyl, aralkyl
$M = H, SO_3^-X^+, \text{ or } PO_3^{2-}2X^+$
where X is cation such as
$Na^+, K^+, NH_4^+$, etc.

n = 10–20
x = 7–8

PEO = poly(ethylene oxide)
PPO = poly(propylene oxide)

The preferred dispersants are amphipathic in nature. Such a dispersant comprises in its molecule an oleophilic group of sufficient length to adsorb firmly to the surface of the dispersed particles and also comprises a hydrophilic group of sufficient length to provide a large enough steric barrier to interparticle attraction. The dispersant may be nonionic or ionic in nature. Particularly preferred are dispersants having ionic groups, such as dispersants of the formula:

n = 10–25

R = aryl and M = $PO_3^{2-}2X^+$
X = $Na^+$, $K^+$ or $NH_4^+$.

These amphipathic dispersants are generally block copolymers, either linear or branched and have segmented hydrophilic and oleophilic portions. The hydrophilic segment may or may not comprise ionic groups and the oleophilic segment may or may not comprise polarizable groups. The dispersants utilized in the present invention are believed to function essentially as steric stabilizers in protecting the dispersion against formation of elastic and other flocs leading to increased viscosity of the aqueous dispersion. Ionic groups, if present, in the hydrophilic segment of the polymer provide added colloidal stabilization through ionic repulsion between the dispersed particles of the polymer. The polarizable groups, if present, in the oleophilic segment of the polymer further enhance association of the dispersant through these anchoring sites with certain flocculation-prone solid particles that are polar in nature.

In general, the amount of dispersant used is preferably about 10 to about 200%, more preferably about 20 to about 100% and most preferably about 35 to 75%. The percentages being by weight of the magnetic particles.

In making the dispersion, it may be advantageous to include an ionic small molecule (i.e. nonpolymeric) surfactant for providing added stability through ionic repulsions. These act as antiflocculating agents and are usually ionic in nature. They can be added before or after the milling step. Representative examples of small molecular surfactants are listed below.

SMS-1 a mixture of:

n = 1–3 and

SMS-3

SMS-4

SMS-5

-continued

SMS-6

SMS-7

SMS-8 where R = $C_{12}$ branched

SMS-9 where R = —$CH(CH_3)C_4H_9$— where R = —$CH_2$—$CH_2$—⌬
SMS-10

SMS-11 where R = —$CH_2$—$\overset{|}{C}H$—$CH_3$ where R = —$CH_2$—$CH(CH_2CH_3)C_3H_7$
SMS-12 where R = —$(CH_2)_nCH_3$ (n = 2, 3 & 5)
SMS-13

SMS-14 where R = —$(CH_2)_n$—⌬   (n = 2–5)

SMS-15

The aqueous magnetic particle dispersion in accordance with this invention are employed in the fabrication of magnetically recordable layers or films and photographic elements that include a support, a light-sensitive layer and a transparent magnetic recording layer. Transparent magnetic recording layers or films would have widespread application in many environments wherein it would be desirable to include or encode information without interfering with the visual appearance of the object onto which the magnetic recording is made. For example, in a sheet of written text or a picture, information could be recorded in a magnetic recording transparent layer without interfering with the visual appearance of the text or the picture underlying the transparent magnetic recording layer. Such transparent recording layers can be prepared by incorporating a film forming binder in the aqueous dispersion to form a coating composition and then applying the coating composition to a substrate. For example, if it were desired to provide magnetically encoded information to this page of text, this page can be coated with the magnetic coating composition. This would then enable one not only to read the visual text in the normal manner but also to read out the information contained in the encoded magnetic transparent layer.

The primary utility for transparent magnetic recording layers is in the photographic industry wherein a photographic film can be built onto a substrate that includes a transparent recording layer. The transparent magnetic recording layer may be disposed in any position relative to the various layers of the photographic film including over the light sensitive layers, within the layers, within the base substrate, however, it is preferred that the transparent magnetic layer be applied as a layer on the side opposite the light-sensitive layers of the photographic film. This provides ease of encoding and readout. One suitable technique would be to prepare the substrate for the film whether it be cellulose acetate, polyethylene terephthalate, polycarbonate paper or other suitable substrate for that purpose with a transparent magnetic recording layer on one surface thereof. This again can be achieved either by coating applications widely known in both the photographic and magnetic recording fields of technology. Information can then be encoded into the magnetic layer during all steps of the preparation of the photographic product. This can include manufacturing data with regard to the various layers that are employed during the preparation of the film, information with regard to the properties of the various layers built onto the substrate and the like. Further, after the film is completed and is being used by the consumer, many and various applications can be envisioned wherein information is included in the magnetic layer that is helpful to the photographer, the developing laboratory and other engaged in this field of endeavor. For example, when a camera also has the capability of imparting data to a magnetic layer by having built in recording heads in the camera, information with regard to each frame of the film can be recorded, such as, the light conditions, the speed at which the frame is exposed, the F-Stop number and the like.

To apply a transparent magnetic layer to a support, a coating composition is prepared, for example by dispersing the aqueous magnetic particle dispersion in an aqueous medium containing a hydrophilic binder. Examples of Hydrophilic binders which can be used are those described in Research Disclosure No. 308119, December 1989, and No. 18716 (page 651) November 1979. Illustrative hydrophilic binders include water-soluble polymers, gelatin, gelatin derivatives, cellulose esters, latex derivatives, casein, agar, sodium alginate, starch, polyvinyl alcohol, polyacrylic acid copolymers and maleic anhydride copolymers and mixtures thereof. The cellulose esters include hydroxyl propyl cellulose, carboxymethyl cellulose and hydroxyethyl cellulose. The latex polymers include vinyl chloride copolymers, vinylidene chloride copolymers, acrylic ester copolymers, vinyl acetate copolymers and butadiene copolymers. Among them, gelatin is most preferred.

Gelatin may be any of so-called alkali-treated (lime treated) gelatin which was immersed in an alkali bath, prior to extraction thereof, an acid-treated gelatin which was immersed in an alkali bath prior to extraction thereof, an acid-treated gelatin which was immersed in both baths and enzyme-treated gelatin. If necessary, gelatin can be used in combination with colloidal albumin, casein, a cellulose derivative (such as carboxymethyl or hydroxyethyl cellulose), agar, sodium alginate, a saccharide derivative (such as a starch derivative or dextran), a synthetic hydrophilic colloid (such as polyvinyl alcohol, poly-N-vinylpyrolidone, a polyacrylic acid copolymer, polyacrylamide or a derivative or partial hydrolyzate thereof) or a gelatin derivative.

The above described coating composition containing the dispersed magnetic particles, dispersant and film-forming hydrophilic binder is coated onto a suitable support either as is or along with additional or optional ingredients such as, crosslinking or hardening agents, coating aids, abrasive particles, lubricants, matting agents, antistatic agents, fillers and the like, before the coating operation. The coating composition can be chill-set and stored prior to use, then heated to coating temperature (40°–60° C.) just prior to coating. This cooling and re-heating does not adversely affect the quality of the coating or the magnetic properties of the resulting transparent magnetic recording layer.

The coating composition is applied to a suitable support which may contain additional layers for promoting adhesion, by any suitable coating device including slot die hoppers, gravure coaters, reverse roll coaters and the like. The thickness of the magnetic layer preferably should be about 0.5 to about 10 μm, more preferably about 0.5 to about 5 μm and most preferably about 1 to about 3 μm.

The magnetic layer can also be overcoated with conventional layers including antistats, protective overcoats, lubricants and the like.

Any suitable support may be employed in the practice of this invention, such as, cellulose derivatives including cellulose diacetate, cellulose triacetate, cellulose propionate, cellulose butyrate, cellulose acetatepropionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate; polystyrene, polypropylene, polyethylene, polymethyl-pentene, polysulfone, polyethersulfone, polyarylates, polyether imides and the like. Supports for photographic elements are described in Research Disclosure, December 1989, Item 308,119 published by Kenneth Mason Publications, Ltd., Dudley Annex, 12a North Street, Emsworth, Hampshire P010 7DQ, England, section XVII, incorporated herein by reference.

Particularly preferred supports are polyethylene terephthalate, polyethylene naphthalate and the cellulose esters particularly cellulose triacetate.

Thickness of those supports used in the present invention is from 50 μm to 180 μm, preferably, 85 to 125 microns. In addition, various dyes may be formulated into the support or the magnetic layer to give neutral density.

Depending upon the nature of the support, suitable transparent tie or undercoat layers may be desired. Particularly with regard to polyester supports, primers are used in order to promote adhesion. Any suitable primers in accordance with those described in the following U.S. patent may be employed: U.S. Pat. Nos. 2,627,088; 3,501,301; 4,689,359;

4,363,872; and 4,098,952. Each of these is incorporated herein by reference in their entirety.

The magnetic recording layer of the present invention containing gelatin or other hydrophilic colloid is preferably hardened.

Hardeners usable for hardening the magnetic recording layer include, for example, aldeyhde compounds such as formaldehyde and glutaraldehyde; ketone compounds such as diacetyl and cyclopentanedione; compounds having reactive halogens such as bis(2-chloroethylurea), 2-hydroxy-4,6-dichloro-1,3,5-trizine and those described in U.S. Pat. Nos. 3,288,775 and 2,732,303 and British Patent Nos. 974,723 and 1,167,207; divinylsulfone, 5-acetyl-1,3-diacrylolhexahydro-1,3,5-triazine and reactive olefin-containing compounds such as divinylsulfone, 5-acetyl-1,2-diacryloyl-hexahydro-1,3,5-triazine, and the compounds such as divinylsulfone, 5-acetyl-1,3-diacryloyl-hexahydro-1,3,5-triazine, and the compounds disclosed in U.S. Pat. Nos. 3,635,718 and 3,232,763, and British Patent 994,8 69; N-hydroxymethylothalimide; N-methylol compounds such as N-hydroxymethylphthalimide and those described in U.S. Pat. Nos. 2,732,316 and 2,586,168; isocyanates described in U.S. Pat. Nos. 3,103,437; the aziridines disclosed in U.S. Pat. Nos. 3,017,280 and 2,983,611; acid derivatives described in U.S. Pat. Nos. 2,725,294 and 2,725,2 95; epoxy compounds described in U.S. Pat. No. 3,091,537; and halogenated carboxyaldehydes such as mucochloric acid. Examples of inorganic hardeners include chrome alum, zirconium sulfate and the carboxyl group activating hardeners described in Japanese Patent Publication for opposition purpose (herein after referred to as J.P. Kokoku) Nos. 56-12853 and 58-32699, Belgian Patent No. 825,726, J. P. Kokai Nos. 60-225148 and 51-126125, J. P. Kokoku No. 58-50699, J .P. Kokai No. 52-54427 and U.S. Pat. No. 3,321,313.

The hardener is generally used in an amount of from 0.01 to 30 weight %, preferably from 0.05 to 20 weight %, to the amount of dried gelatin.

As mentioned above, additional ingredients can be included in the coating composition of this invention. In certain embodiments of the invention, the coating composition (and thus, the magnetic layer) contains abrasive particles, reinforcing fillers or tin oxide.

Examples of abrasive particles include nonmagnetic inorganic powders with a Mohs scale hardness of not less than 6. Specific examples are metal oxides such as alpha-alumina, chromium oxide (e.g., $Cr_2O_3$), iron oxide alpha (e.g., $Fe_2O_3$), silicon dioxide, alumino-silicate and titanium carbide; nitrides such as silicon carbide and titanium carbide; nitrides such as, silicon nitride, titanium nitride and diamond in fine powder. Alpha alumina and silicon dioxide are the preferred abrasives in accordance with this invention. These can be pre-dispersed in water using the same dispersants as described in this invention and then incorporated into the coating composition.

Examples of reinforcing filler particles include nonmagnetic inorganic powders with a Mohs scale hardness of at least 6. Specific examples are metal oxides such as γ-aluminum oxide, chromium oxide, (e.g., $Cr_2O_3$), iron oxide (e.g., alpha-$Fe_2O_3$), tin oxide, doped tin oxide, such as antimony or indium doped tin oxide, silicon dioxide, alumino-silicate and titanium dioxide; carbides such as silicon carbide and titanium carbide; and diamond in fine powder. These can also be pre-dispersed in water using the same dispersants as described in this invention and then incorporated into the coating composition.

Tin oxide particles in any form may be employed such as tin oxide per se or doped tin oxides, such as, antimony or indium doped tin oxide. The tin oxide may be used in either the conductive or non-conductive form; however, when in the conductive form, an additional advantage is gained in that the layer also acts as an antistat. Suitable conductive particles are disclosed in U.S. Pat. Nos. 4,495,276; 4,394,441; 4,431,764; 4,418,141 and 4,999,276 incorporated herein by reference. Useful tin oxide particles are commercially available from Keeling and Walker, Ltd. under the trade designation Stanostat CPM 375; DuPont Co. under the trade designation Zelec-ECP 3005XC and 3010SC and Mitsubishi Metals Corp. under the trade designation T-1. These can be also be pre-dispersed in water using the same dispersants as described in this invention and then incorporated into the coating composition.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Both negative and reversal silver halide elements are contemplated. For reversal films, the emulsion layers as taught in U.S. Pat. Nos. 5,236,817, especially Examples 16 and 21, are particularly suitable. Any of the known silver halide emulsion layers, such as those described in Research Disclosure, Vol. 176, December 1978 Item 17643 and Research Disclosure Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. Nos. 2,761,791 and 3,508,947. Additional useful coating and drying procedures are described in Research Disclosure, Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 mg/m$^2$ when uniformly distributed across the desired area of the photographic element will be sufficiently photographically transparent provided that the maximum particle size is less than about 1 micron. Particle concentrations less than about 10 mg/m$^2$ tend to be insufficient for magnetic recording purposes and particle concentrations greater than about 1000 mg/m$^2$ tend to be too dense for photographic purposes. Particularly useful particle concentrations are in the range of 20–70 mg/m$^2$. Concentrations of about 20 mg/m$^2$ have been found to be particularly useful in reversal films and concentrations of about 40 mg/m$^2$ are particularly useful in negative films.

The photographic elements according to this invention can contain one or more conducting layers such as antistatic layers and/or anti-halation layers such as such as described in Research Disclosure, Vol. 176, December 1978, Item 17643 to prevent undesirable static discharges during manufacture, exposure and processing of the photographic element. Antistatic layers conventionally used in color films have been found to be satisfactory for use herewith. Any of the antistatic agents set forth in U.S. Pat. No. 5,147,768, which is incorporated herein by reference may be employed. Preferred antistats include metal oxides, for example, tin oxide, antimony doped tin oxide and vanadium pentoxide.

The photographic elements according to this invention can be provided with a protective or lubricating layer, such as a wax layer, in or over the transparent magnetic recording layer. Suitable lubricants include silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms.

Specific examples of these compounds (i.e., alcohols, acids or esters) include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol.

The following examples illustrate the preparation of stable aqueous dispersions of magnetic particles and transparent magnetic recording layers in accordance with this invention.

Example 1

A finely divided concentrate of a magnetic material was made by milling 20 parts of Co-surface treated-γ-iron oxide powder supplied by Toda Kogyo under the trade designation CSF 4085V2 and 20 parts of a 50% by weight solution of the dispersant Syn Fac 8337 (sold by Milliken Chemical)in 70 parts deionized water in a small media mill. The sample was milled for 1–1.5 hours until the average particle size was down to 0.25 microns.

Example 2

Figure 1:
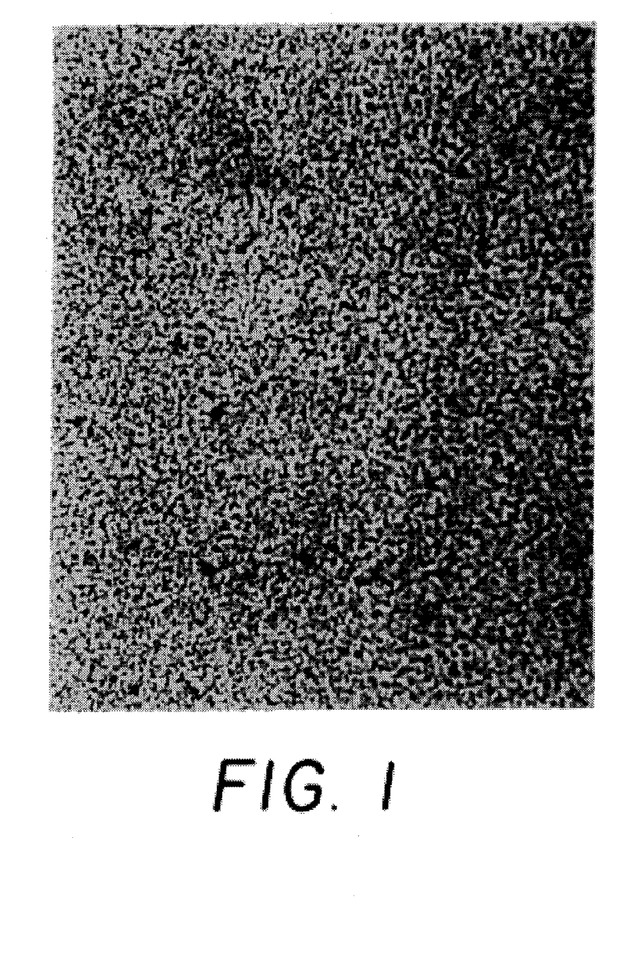
FIG. 1 through FIG. 4 are photomicrographs of a magnetic layer on a support in accordance with this invention.

0.225g of the dispersion from Example 1 was added to 14.7g of a 10% aqueous solution of deionized cowbone gelatin at 39° C. and the mixture stirred at that temperature to yield a fine dispersion of ferric oxide in gelatin. The dispersion thus obtained was treated with 0.55 g of 10% nonylphenoxy polyglycerol (obtained from Olin under the trade designation Olin10G), a coating aid, and coated on gel subbed cellulose triacetate at room temperature using a coating knife with a spacing of 0.0015 inch and dried at room temperature. FIG. 1 shows a photomicrograph of the magnetic layer produced in this example.

Example 3

Figure 2:
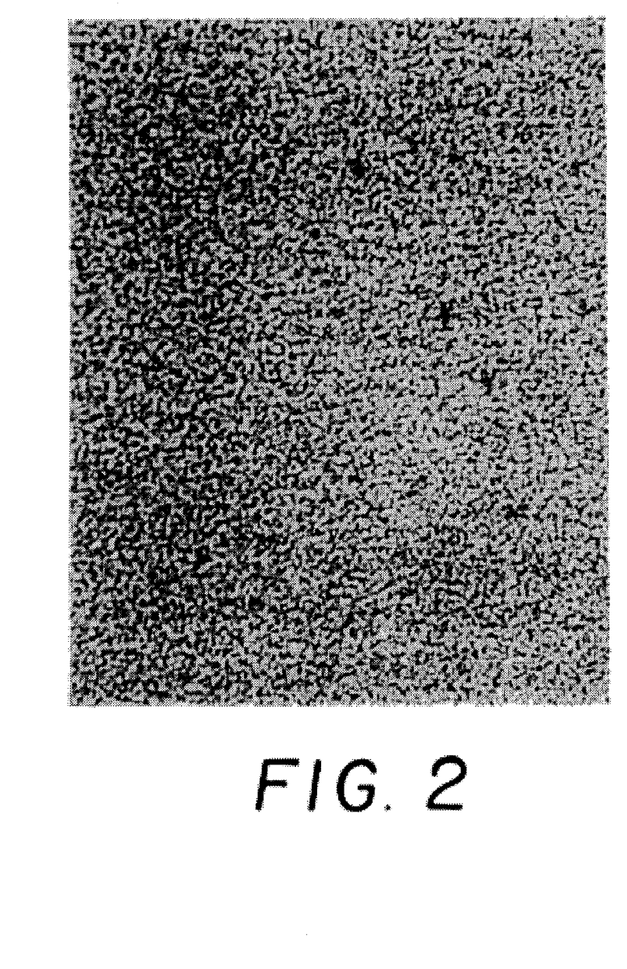

0.45g of dispersion from Example 1 was added to gelatin and coated as described in Example 2. FIG. 2 shows a photomicrograph of the magnetic layer produced in this example.

Example 4

Figure 3:
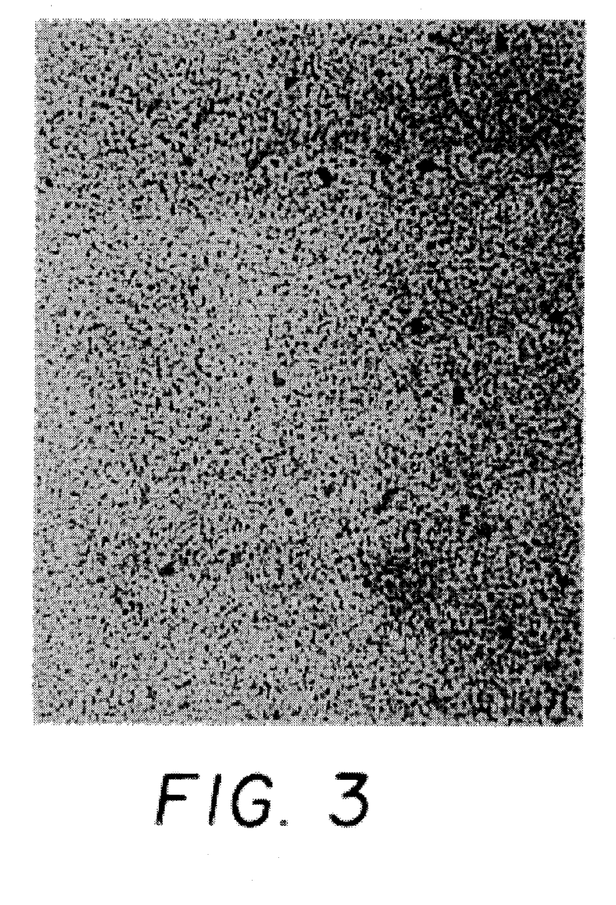

The dispersion from Example 2 was treated with (2% by weight with respect to gelatin) bis(vinyl sulfonyl methyl ether), a hardener solution prior to coating on the support and dried at 55° C. in air. FIG. 3 shows a photomicrograph of the magnetic layer produced in this example.

Example 5

A dispersion of 0.21 micron α-alumina abrasive particles (commercially available from Sumitomo Chemical Company under the designation AKP50) was prepared in water by ball milling 25 g AKP50, 10 g of a 50% by weight solution of Syn Fac 8337 and 75 g deionized water.

Figure 4:
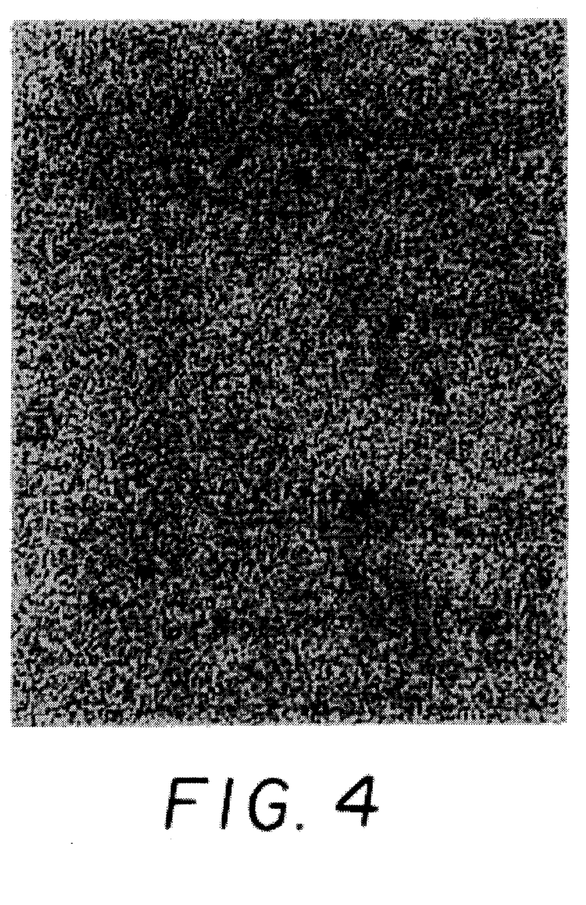

The dispersion from Example 2 was treated with a portion of the AKP50 dispersion described above such that the abrasive particles made up 0.235% of the total. This was coated as in Example 2. FIG. 4 shows a photomicrograph of the magnetic layer produced in this example.

Example 6 (comparative)

A comparative coating of magnetic particles was prepared as described in Example 7 of U.S. Pat. No. 5,217,804. First, a dispersion of magnetic particles, in methylene chloride, methyl alcohol, and butanol was prepared. Cellulose triacetate was added and the resulting composition was coated onto a cellulose ester support.

Figure 5:
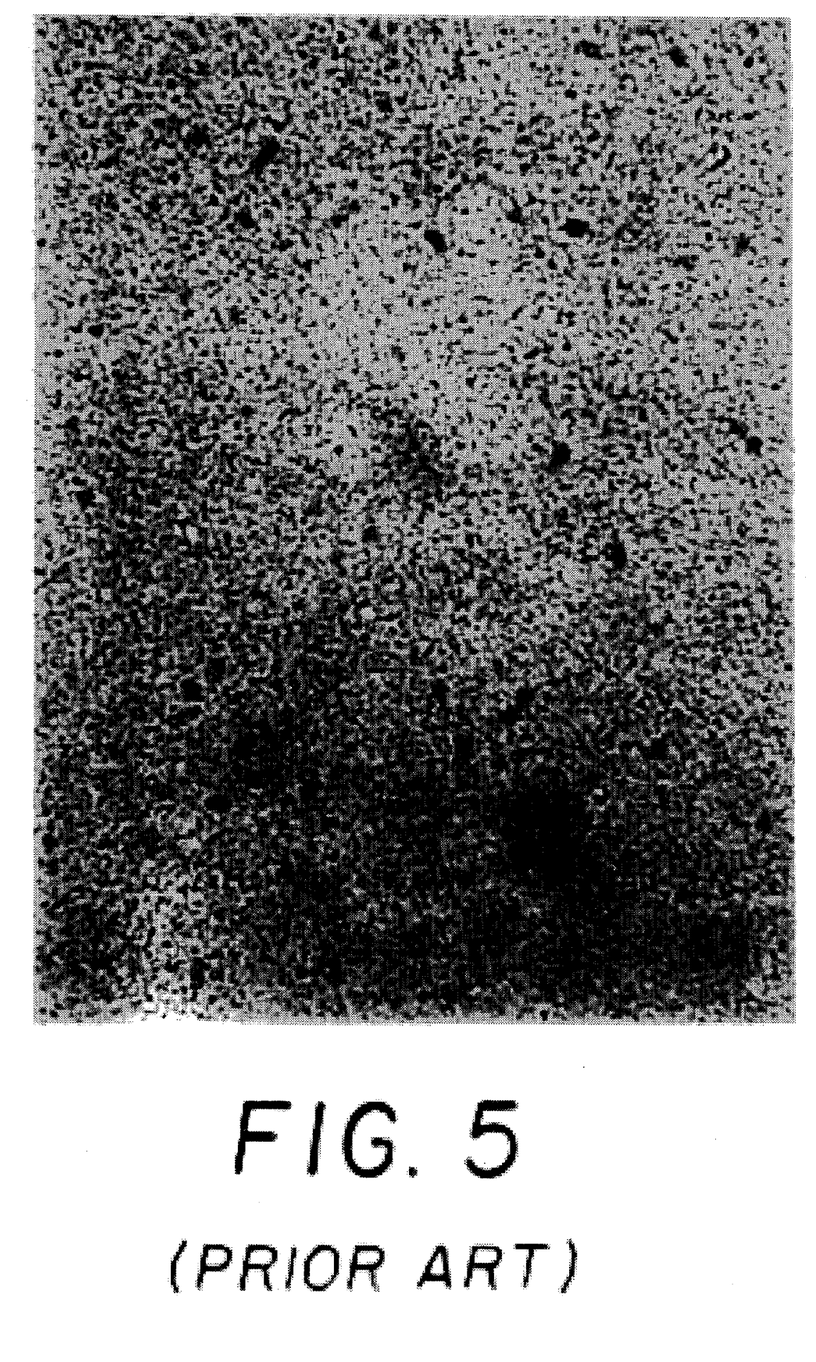
FIG. 5 is a comparative photomicrograph of a magnetic layer on a support produced from an organic casting solution of magnetic particles.

A photomicrograph of this coating is shown in FIG. 5. A comparison of the photomicrographs of FIGS. 1–5 illustrate that the magnetic layers of Examples 2–5 prepared from aqueous systems are comparable to magnetic layer of Example 6 prepared from an organic solvent based system.

The invention has been described in detail with particular reference to preferred embodiments thereof, but it is to be understood that variations and modifications can be effected within the spirit and scope of the invention.

What is claimed is:

1. A stable fine solid particle aqueous dispersion useful for forming a magnetic recording layer, which comprises an aqueous medium containing dispersed magnetic particles and a dispersant having an HLB number of at least 8 selected from the group of amphipathic water-soluble or water-dispersible polymers represented by one of the following structures:

and

-continued $$(AB)_x Q(BA)_z \quad \text{IV}$$

wherein each A independently represents 1 to about 150 repeat units of a water-soluble component; B and C each represent a linear or branched alkyl, aryl, alkaryl or cyclic alkyl radical containing at least 7 carbon atoms, or 3 to about 100 repeat units of a propylene oxide or higher alkylene oxide or combinations thereof; O represents a multivalent linking group; m=50–100 mole % and n=1–50 mole %, with the proviso that m+n=100 mole %, x=1 or 2 and z=1 or 2.

2. A dispersion of claim 1, wherein the dispersant has the formula:

$n = 10–25$

R = aryl, alkyl, aralkyl
M = H, $SO_3^- X^+$, or $PO_3^{2-} 2X^+$
where X is cation 3. A dispersion of claim 2, wherein the dispersant is an anionic aryl phenol alkoxylate.

4. A dispersion of claim 2, wherein the dispersant has the formula:

$n = 10–25$

R = aryl and M = $PO_3^{2-} 2X^+$
X = $Na^+$, $K^+$ or $NH_4^+$

5. A dispersion of claim 1, which further contains abrasive particles.

6. A dispersion of claim 1, which further comprises a binder.

7. A dispersion of claim 6, wherein the binder is a hydrophilic colloid.

8. A dispersion of claim 7, wherein the hydrophilic colloid is gelatin.

9. A dispersion of claim 1, wherein the magnetic particles exhibit coercive force above about 500 Oe.

10. A magnetic recording element comprising a support and a magnetic recording layer coated thereon, wherein the recording layer is prepared by combining a film-forming binder and a stable aqueous dispersion of magnetic particles in accordance with claim 1 to form a coating composition and applying said coating composition onto the support.

11. A magnetic recording element of claim 10, wherein the magnetic particles exhibit coercive force above about 500 Oe.

12. A process for the preparation of a magnetic recording element which comprises the steps of combining a film forming binder and a stable aqueous dispersion of magnetic particles in accordance with claim 1 to form a coating composition and applying said coating composition onto a support.

13. A process for preparing a photographic element having a transparent magnetic recording layer which comprises adding a film-forming binder to a stable aqueous dispersion of magnetic particles in accordance with claim 1 to form a coating composition and applying said coating composition onto a photographic support to form a transparent magnetic recording layer.

14. A process for the preparation of a stable fine solid particle aqueous dispersion of magnetic particles useful for forming a magnetic recording layer, which comprises the steps of:

(a) forming an aqueous slurry of solid magnetic particles and a dispersant having an HLB number of at least 8 selected from the group of amphipathic water-soluble or water-dispersible polymers represented by one of the following structures:

$$A - B \quad \text{I}$$

$$A - B - A \quad \text{II}$$

$$\begin{array}{c} -[B]_m - [C]_n - \\ | \\ A \end{array} \quad \text{III}$$

and $$(AB)_x Q(BA)_z \quad \text{IV}$$

wherein each A independently represents 1 to about 150 repeat units of a water-soluble component; B and C each represent a linear or branched alkyl, aryl, alkaryl or cyclic alkyl radical containing at least 7 carbon atoms, or 3 to about 100 repeat units of a propylene oxide or higher alkylene oxide or combinations thereof; O represents a multivalent linking group; m=50–100 mole % and n=1–50 mole %, with the proviso that m+n=100 mole %, x=1 or 2 and z=1 or 2; and (b) milling said slurry for a period of time sufficient to ensure that substantially no agglomerates of the magnetic particles are present.

15. A photographic element comprising a photographic support, a light sensitive layer and a transparent magnetic recording layer, wherein the transparent magnetic recording layer has been prepared by combining a film-forming binder and a stable dispersion of magnetic particles in an aqueous medium containing a dispersant having an HLB number of at least 8 selected from the group of amphipathic water-soluble or water-dispersible polymers represented by one of the following structures:

$$A - B \quad \text{I}$$

$$A - B - A \quad \text{II}$$

$$\begin{array}{c} -[B]_m - [C]_n - \\ | \\ A \end{array} \quad \text{III}$$

and $$(AB)_x Q(BA)_z \quad \text{IV}$$

wherein each A independently represents 1 to about 150 repeat units of a water-soluble component; B and C each represent a linear or branched alkyl, aryl, alkaryl or cyclic alkyl radical containing at least 7 carbon atoms, or 3 to about 100 repeat units of a propylene oxide or higher alkylene oxide or combinations thereof; O represents a multivalent linking group; m=50–100 mole % and n=1–50 mole %, with the proviso that m+n=100 mole %, x=1 or 2 and z=1 or 2, to form a coating composition and applying said coating composition onto said photographic support.

16. A photographic element of claim 15, wherein the dispersant has the formula:

n = 10–25

R = aryl, alkyl, aralkyl
M = H, $SO_3^- X^+$, or $PO_3^{2-} 2X^+$
where X is cation

17. A photographic element of claim 16, wherein the dispersant is an anionic aryl phenol alkoxylate.

18. A photographic element of claim 16, wherein the dispersant has the formula:

n = 10–25

R = aryl and M = $PO_3^{2-} 2X+$
X = $Na^+$, $K^+$ or $NH_4^+$

19. A photographic element of claim 15, wherein the magnetic recording layer contains abrasive particles.

20. A photographic element of claim 15, wherein the binder is a hydrophilic colloid.

21. A photographic element of claim 20, wherein the hydrophilic colloid is gelatin.

22. A photographic element of claim 15, wherein the magnetic particles exhibit coercive force above about 500 Oe.

* * * * *